Sept. 25, 1934.    G. N. GOODRICH ET AL    1,975,039
PASTING MACHINE
Original Filed April 28, 1930    5 Sheets-Sheet 1
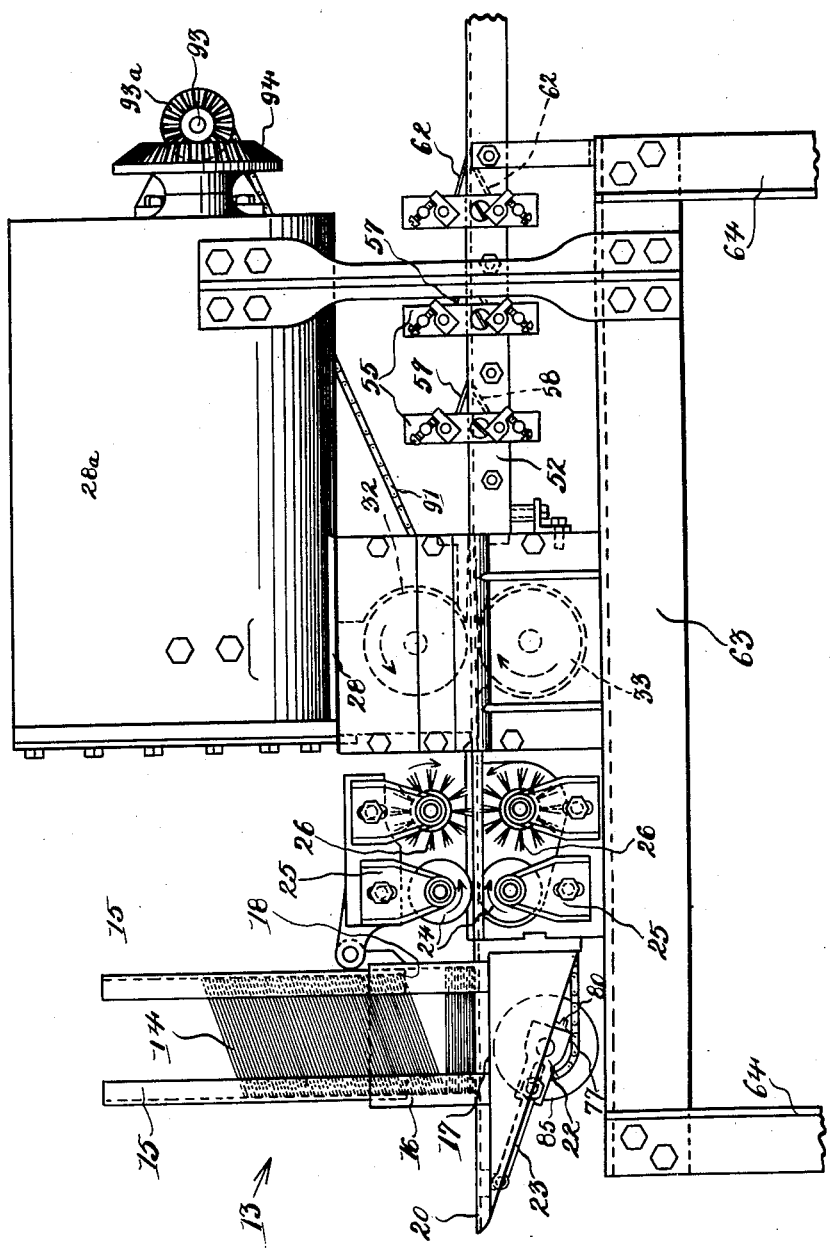
Inventors
Carl G. Reetz
George N. Goodrich
By Stryker & Stryker
Attorneys

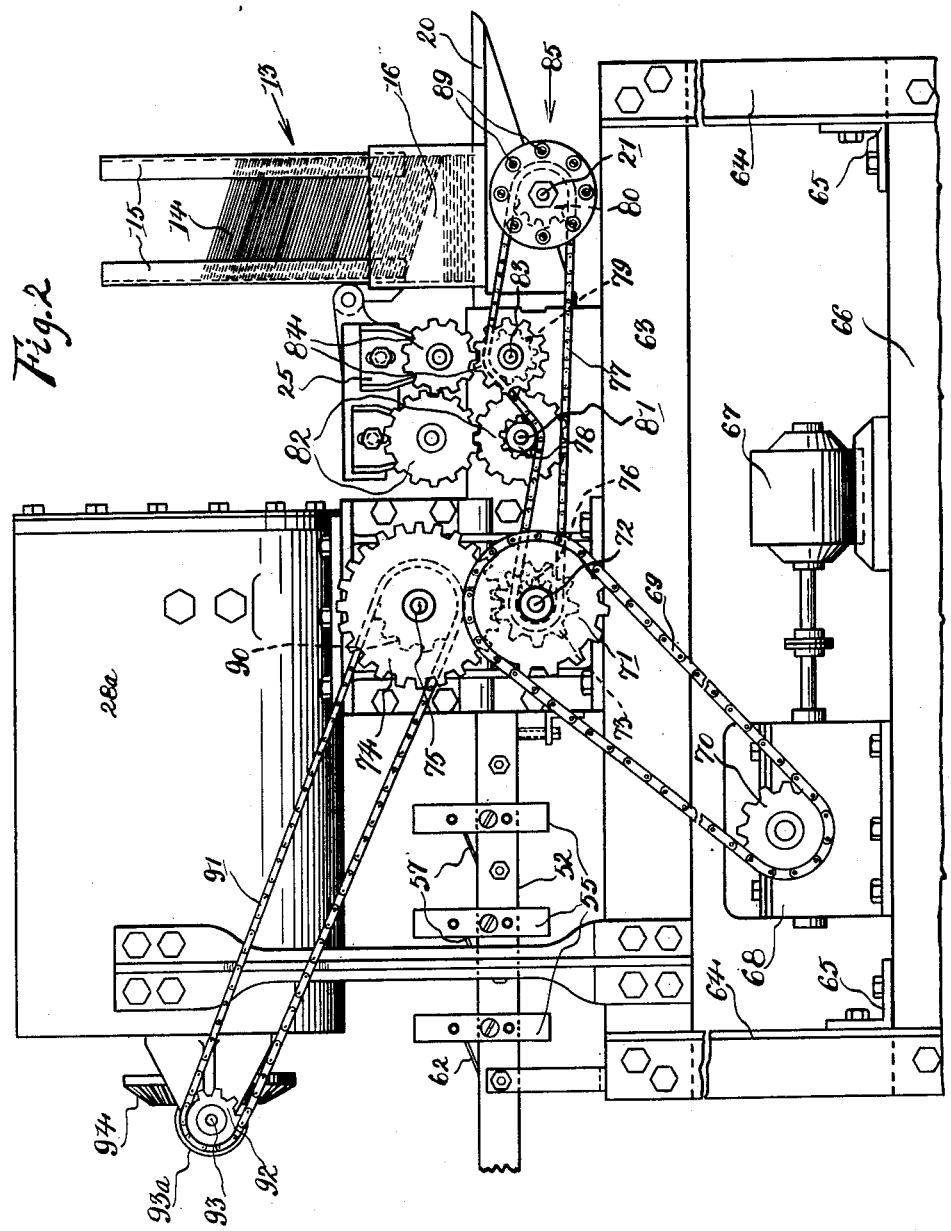

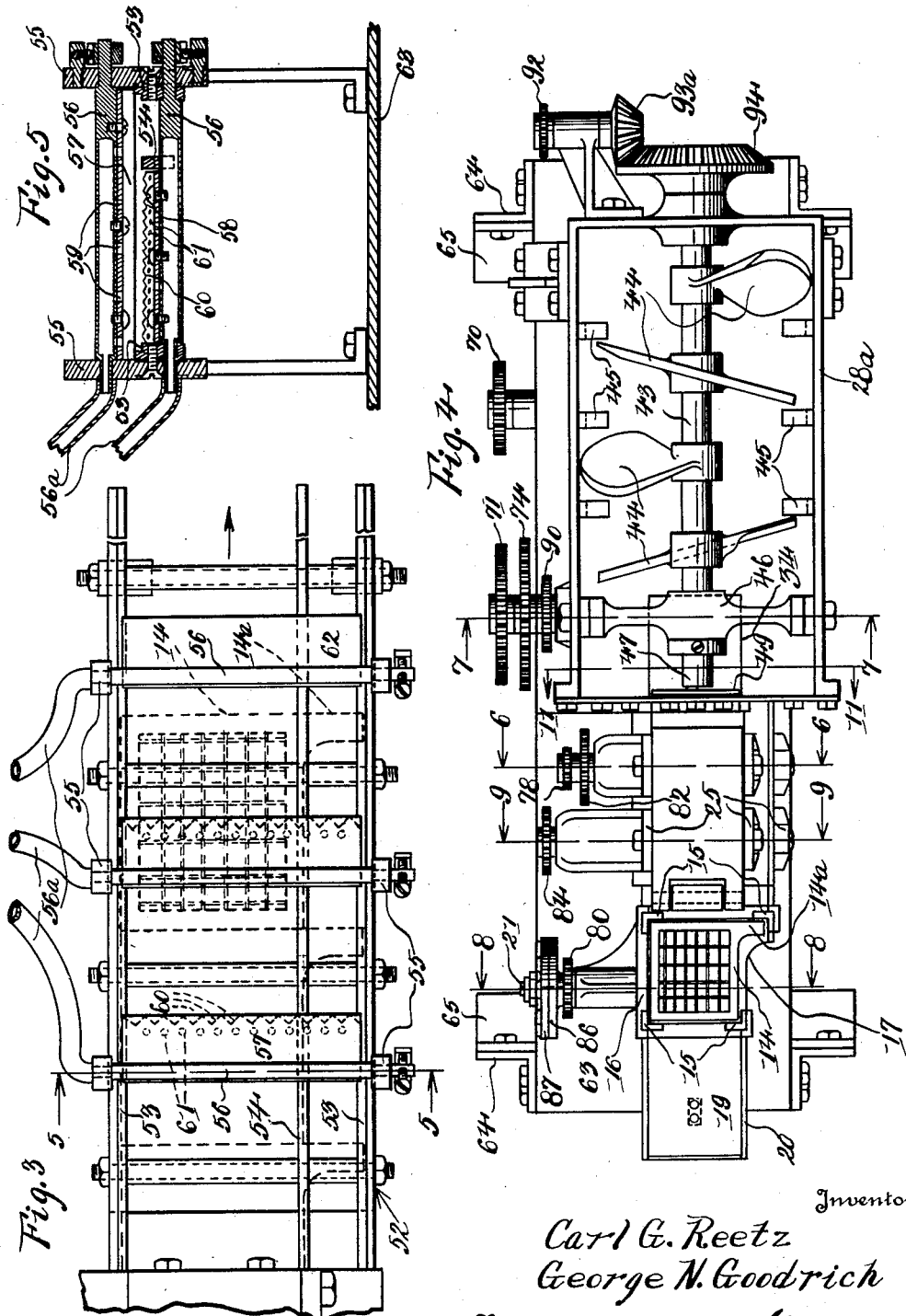

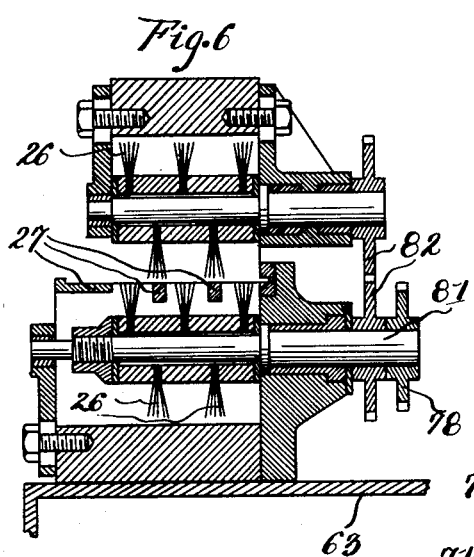
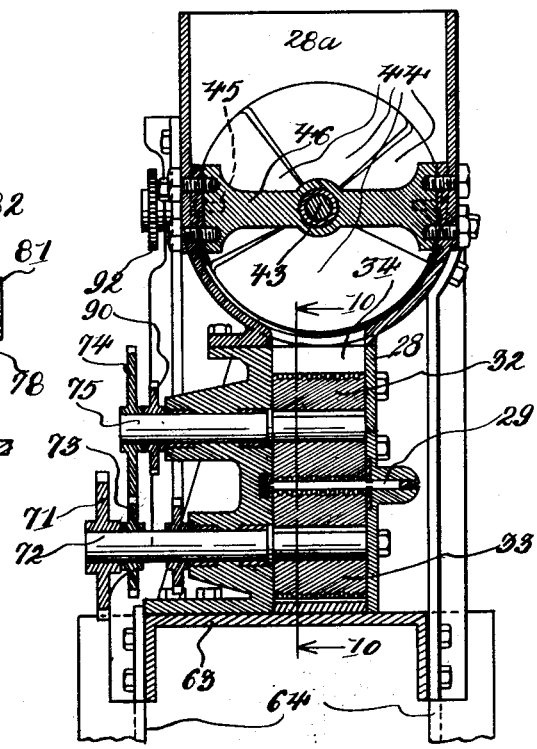
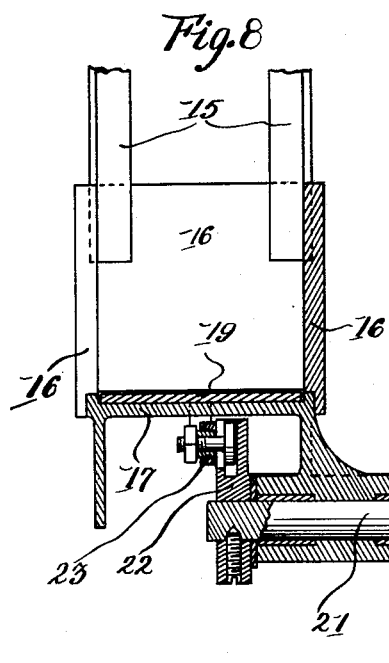
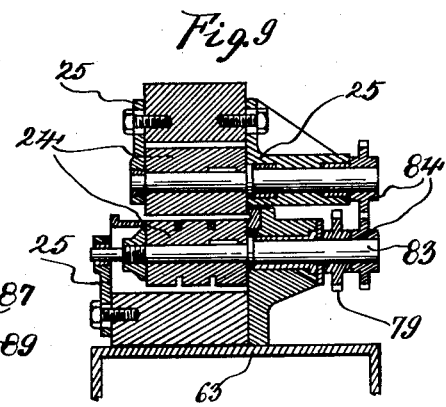
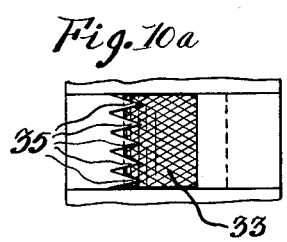

Sept. 25, 1934. G. N. GOODRICH ET AL 1,975,039
PASTING MACHINE
Original Filed April 28, 1930    5 Sheets-Sheet 5

Inventors
Carl G. Reetz
George N. Goodrich
By Stryker & Stryker
Attorneys

Patented Sept. 25, 1934

1,975,039

UNITED STATES PATENT OFFICE 1,975,039

PASTING MACHINE

George N. Goodrich, Walled Lake, Mich., and Carl G. Reetz, St. Paul, Minn., assignors to National Battery Company, St. Paul, Minn., a corporation of Delaware Application April 28, 1930, Serial No. 448,136
Renewed February 26, 1934

24 Claims. (Cl. 226—39)

This invention relates to pasting machines for use in filling the grids of storage batteries. It is our object to provide a machine for more uniformly and completely filling the interstices of grids with the lead oxide or other paste.

Further objects of this invention are to improve the contact between the paste and grid elements, to economize in the use of the paste by practically eliminating waste and to generally improve the mechanical construction of machines of this kind so that the work of cleaning and preparing the machine for repeated use is minimized. Our invention also includes certain other novel features of construction which will be more fully pointed out in the following specification and claims.

Figure 10:
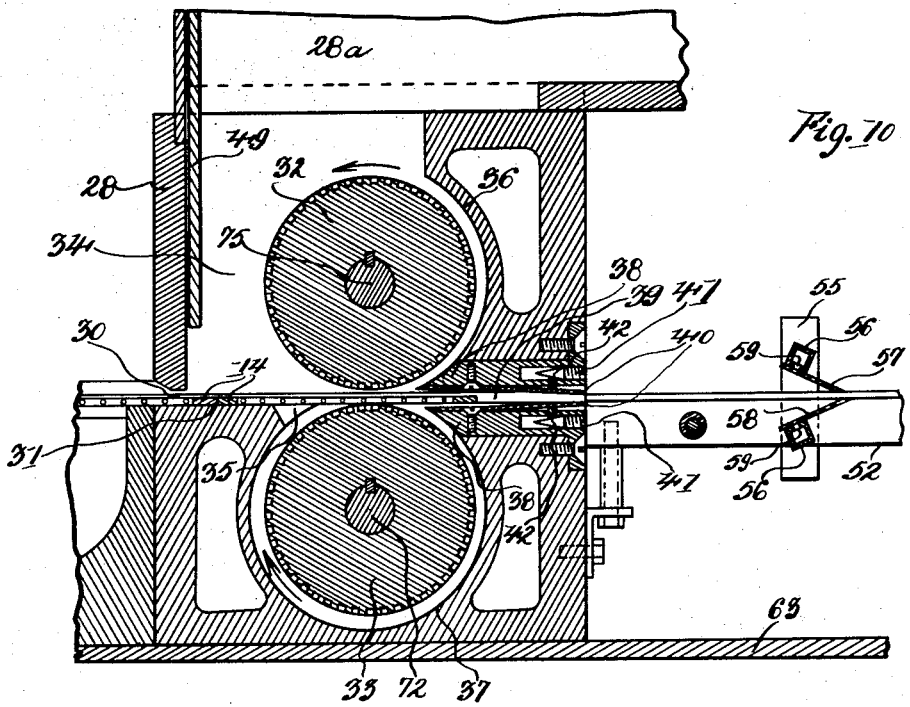
Figure 11:
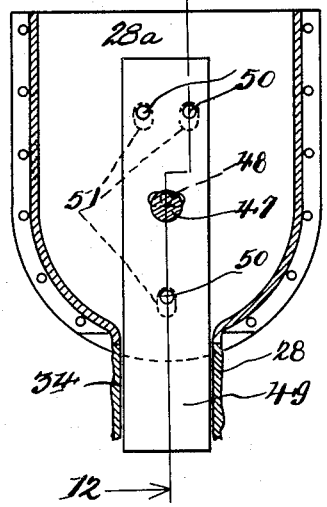
Figure 12:
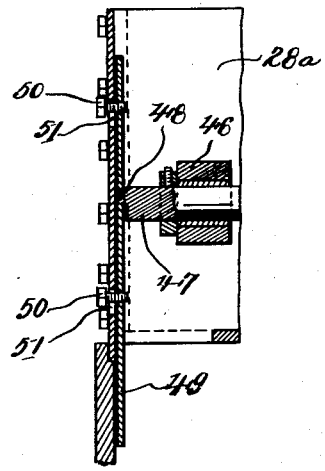

In the accompanying drawings, which illustrate the best form of our device at present known to us, Figure 1 is a front elevation of our improved machine; Fig. 2 is a rear elevation showing the driving connections with a suitable motor; Fig. 3 is a plan view of the delivery end of the machine with the paste hopper removed; Fig. 4 is a plan view of the feeding end, central portion and hopper; Fig. 5 is a typical vertical section through a pair of the troweling and moistening elements near the delivery end of the machine, taken on the line 5—5 of Fig. 3; Figs. 6, 7, 8 and 9 are fragmentary, vertical sections taken respectively on the lines 6—6, 7—7, 8—8 and 9—9 of Fig. 4; Fig. 10 is a fragmentary, vertical section taken on the line 10—10 of Fig. 7; Fig. 10a is a fragmentary, plan view showing the fingers for supporting the grids in the paste hopper; Fig. 11 is a section through the paste hopper taken on the line 11—11 of Fig. 4 and Fig. 12 is a fragmentary section taken on the line 12—12 of Fig. 11.

Near one end of our machine we provide a hopper 13 for the grids to be filled with paste. This hopper has at each corner a vertical angle bar 15 which extends upward in continuation of a base receptacle 16 which is secured to a bed plate 17, as shown in Figs. 1, 4 and 8. The base receptacle 16 of the hopper is arranged to receive a small number (preferably 8 to 12) grids in horizontal position as indicated in Fig. 1 and the additional grids above this number are retained by the bars 15 in an inclined position with the front edges above their rear edges. The lower ends 18 of the front pair of angle bars 15 are offset inward from the vertical surface of the base receptacle 16 so as to allow the inclined grids 14 to fall to horizontal position as they are lowered, one by one, by removal of the grids successively from the bottom of the hopper.

A feed blade 19 is movable horizontally on the base 17 and on an extension 20 of said base which projects from the feeding end of the machine. To produce reciprocating movement of the feed blade 19, we provide a power-driven shaft 21 having a crank 22 on its end beneath the hopper 13. This crank 22 is joined by a connecting rod 23 with the feed blade 19.

Knurled drive rolls 24 are arranged to receive the grids as they are fed from the hopper 13 by the blade 19. These feed rolls are preferably provided with knurled peripheries adapted to firmly grip the grids between them, and as best shown in Figs. 1 and 9 are supported in adjustable bearings 25 so that the pressure on the grids between the bite of the rolls may be adjusted. From the feed rolls 24 the grids pass horizontally to a pair of stiff wire brushes 26 designed to scratch or roughen the surfaces before they receive a supply of paste. A suitable horizontal guide extends from the hopper 13 to direct the grids to the feed rolls and from said rolls the grids are supported on bars 27 (Fig. 6) extending between the brushes 26 to a hopper 28 containing the paste, known as "mud".

As best shown in Fig. 10, this hopper 28 has a horizontal slot 30 through which the grids 14 are fed upon a horizontal surface 31. Revolubly mounted within the hopper 28 are paste rolls 32 and 33 preferably provided with knurled or otherwise roughened peripheries between which the grids are fed. These rolls are arranged with their peripheries spaced apart a distance slightly greater than the thickness of the grid so as to permit the paste or mud to pass between them as it is pressed into the interstices of the grid webbing to form what is known as plate pellets.

The grids are of the common type each having a lug 14a projecting from the upper edge. As hereinafter more fully described, we retain the grids in edge to edge contact as they are fed through the machine and this causes the lugs 14a to project in spaced relation to each other and at one side of the line of moving grids. In order to prevent the application of the paste to the lugs and in large quantities between them, we provide a receptacle 29, which projects in continuation of the space between the paste rolls. Objectionable quantities of the paste do not enter this receptacle 29.

The paste is supplied from the upper part of the hopper, as hereinafter described, through a large passage 34 and from the passage 34 is delivered to the bite of the rolls 32 and 33 and downward into the openings in the grids. A series of fingers 35 are arranged in continuation of the horizontal surface 31 to project closely adjacent to the bite of the rolls. These fingers support the grids and at the same time allow passage of paste downward through the grids from the periphery of the upper roll 32. The rolls, which are rotated in the direction indicated by arrows in Fig. 10, have their peripheries in spaced relation to cylindrical surfaces 36 and 37 of the casings. The peripheral passages thus formed permit the paste which adheres to the roll peripheries to pass from the delivery to the receiving side of the bite. This is particularly advantageous at the lower roll 33 because it is important that an ample supply of the paste be delivered to the bottom as well as the top surface of the grid where it passes to the bite of the rolls. The paste is carried between the fingers 35 into the interstices of the grid and is applied uniformly upward into firm contact with the grid by the rotation of the lower roll. To further facilitate the passage of the paste from the delivery to the receiving side of the bite the cylindrical surface 37 is formed eccentrically relative to the periphery of the roll 33 so that the annular passage between the roll and said surface increases in width toward the receiving side of the bite. The cylindrical surface 36 is also made eccentric relative to the roll 32 and facilitates the passage of the mud in the direction of rotation.

A pair of cutoff blades 38 project toward the bite of the rolls at the delivery side so as to direct the excess paste at this point around the peripheries of the rolls above and below a restricted outlet 39 for the grids. Within this outlet 39 are positioned resilient plates 40 which restrict the opening and perform the initial troweling operation after the paste has been applied to the grid. The plates 40 are constructed from suitable spring sheet metal and are made adjustable by providing adjusting screws 41 having tapered inner ends engaging small keys 42 that transmit movement to the plates 40, inward upon the grids.

An upper portion 28a of the hopper 28 constitutes a large reservoir for the paste. Within this reservoir, on a horizontal shaft 43, is mounted a series of propeller blades 44 adapted to advance the paste to the feed passageway 34. Small stator blades 45 project within the hopper to prevent rotation of the entire mass of paste. The shaft 43 has a suitable support 46 near the delivery end of the hopper and mounted on its projecting end 47 is an eccentric pin 48, best shown in Figs. 11 and 12, for imparting reciprocating movement to a plate 49. This plate 49 is provided to insure smooth, continuous flow of the paste and to prevent it from becoming clogged in the passageway 34. The plate is mounted on bolts 50 projecting through suitable guide slots 51 in the end of the hopper and threaded in the hopper end plate.

A receiving table 52 projects in continuation of the outlet passage 39 and has longitudinally extending guide rails 53 and a third rail 54 for supporting the grids. As best shown in Fig. 3, the lugs 14a of the grids 14 are supported on one of the guide rails 53 while the top of the frame is supported on the rail 54 and the bottom on the other rail 53. The grids are advanced in a continuous line, one against another, by the feed rolls 24 and the final troweling to give smooth, firm packing of the paste in the grids is performed as they pass along the table 52. The troweling mechanism comprises a series of pairs of resilient blades disposed in the path of the grids. The surfaces of the grids are moistened by the application of a small amount of water as each grid approaches a pair of troweling blades. The troweling and moistening devices are supported in frame members 55. As best shown in Figs. 3 and 10, a pair of tubular members 56 extend between the frame members 55 of each pair and top blades 57 and bottom blades 58 are secured to the tubular members. The top blades 57 are straight, smooth and flexible members which extend obliquely in the direction of movement of the grids so as to resiliently press upon their upper surfaces. Perforations 59 in the tubular members 56 deliver small streams of water to the grids and the tubular members 56 are supplied with water under pressure from hoses 56a. The lower troweling blades 58 are preferably formed with serrated edges 60, as indicated in Figs. 3 and 5, and a series of perforations 61 are formed in these lower blades a short distance back from the serrated edges.

It has been found that the serrated edges and perforations produce more uniform packing to a uniform thickness because where an excess has been applied to any grid the surplus is allowed to escape through the openings and serrations in the blade. Two sets of the blades 57 and 58 are preferably provided, as indicated in Figs. 1 and 3, and a third set of troweling blades 62 are arranged in a manner similar to the blades 57 and 58, but the bottom blade 62 is preferably made like the blades 57, without serrations or perforations. This insures a final troweling which gives a uniform smoothness to the moistened grid surfaces.

The frame of the machine has a main bed 63 of substantially rectangular form supported on legs 64 which, as shown in Fig. 2, are joined by suitable transverse members 65. An auxiliary bed 66 for supporting a suitable motor 67 and speed reducing mechanism 68, of well known construction, is also connected to the legs 64. The machine is driven by a chain 69 operated by a drive sprocket 70, connected in well known manner to the motor 67. A driven sprocket wheel 71 is fixed on a shaft 72 and this shaft 72 supports and drives the lower mud roll 33. A small pinion 73 is secured on the shaft 72 for driving the upper mud roll 32, through a gear 74, with a peripheral speed of about half that of the lower mud roll. The gear 74 is mounted on a driving and supporting shaft 75 for the upper mud roll 32.

As shown in Fig. 2, a sprocket wheel 76 is also fixed on the shaft 72 for operating a chain 77 having a driving connection with sprockets 78, 79 and 80 for operating the brushes 26, feed rolls 24 and feed blade 19, respectively. The sprocket 78 is fixed on a shaft 81 supporting the lower brush 26 and this shaft 81 is connected by gears 82 to a shaft supporting the upper brush 26. In a similar manner a shaft 83 supporting the lower feed roll 24 is arranged to be driven by the sprocket 79 and is connected by gears 84 to a shaft for supporting and driving the upper feed roll 24.

A friction clutch 85 is mounted on an end of the shaft 21 for operating the feed blade 19. As best shown in Fig. 8, this friction clutch 85 consists of a disc 86 revolubly mounted on the shaft 21 and rigidly connected to the drive sprocket 80, together with a second disc 87 fixed on the end of the shaft 21 and provided with contact elements 88 frictionally engaging the outer face of the disc 86. The elements 88 are adjustably held in contact with the disc 86 by suitable set screws 89.

To rotate the shaft 43 in the mud hopper, a sprocket 90 is mounted on the shaft 75 to drive a chain 91. As best shown in Figs. 2 and 4, this chain 91, in turn, drives a sprocket wheel 92 on a shaft 93 which is journaled in a suitable bearing on the end of the hopper and has a beveled pinion 93a for driving gear 94 fixed on an end of the shaft 43.

Operation

In operation, a supply of the empty grids 14 is placed in the hopper 13, as shown in Figs. 1 and 2. It will be understood that the large number of these grids in the hopper have considerable weight and that their surfaces are somewhat rough so that if the entire weight were placed on the bottom grid in a pile considerable force, and a variable one, would be required to slide the lowermost grid from beneath the pile. We have found that by our arrangement of the grids in inclined position in the hopper the force required to remove the bottommost grid in the feeding operation is greatly reduced and more uniform operation is secured. A sufficient number of the grids is retained in horizontal position in the hopper to insure proper engagement of the feed plate with the rear edge of the bottom grid. With the grid hopper thus filled and a supply of the paste in the mud hopper 28 the machine is operated while water under suitable pressure is supplied to the pipes 56a connected to the tubular supports 56 for the troweling blades.

When the machine is placed in operation it will now be understood that the blade 19 is given reciprocating movement in a horizontal plane so as to successively remove the grids from the bottom of the hopper 13 and to advance them one at a time into the bite of the feed rolls 24. The timing of the feed rolls 24 relative to the feed blade 19 is such that a second grid is delivered from the hopper against the rear edge of the preceding grid before the more advanced grid has left the bite of the feed rolls and the advanced edge of the rear grid is retained in contact with the rear edge of the advanced grid until the rear grid is firmly in the bite of the rolls. Thus the grids are retained in edge to edge contact one with another as they pass through the machine. This is an important feature of our invention and in order to secure this result we provide the friction clutch in the connections for driving the feed blade. This clutch 85 is so adjusted relative to the bite or pressure applied by the feed rolls 24 that the clutch will slip when the advanced edge of one grid strikes the rear edge of a preceding grid in the bite of the feed rolls. The feed blade advances the grids more rapidly than the feed rolls. In this manner the grids are passed through the paste hopper in edge to edge contact one with another and there is no waste of the paste such as would be caused by filling the spaces between grids if they were separately passed through the hopper.

The knurled feed rolls are continuously rotated to produce a steady flow of the grids through the machine. They first pass between the rotary brushes 27 where the wire bristles scratch or roughen the surfaces which are subsequently supplied with paste. The direction of rotation is indicated by arrows in Fig. 1. Now the stream of grids passes through the opening 30 and then between the mud rolls 32 and 33 which fill the grids both from the top and bottom.

The paste rolls, having knurled or otherwise roughened peripheries, continuously press measured or ribbon-like masses of the mud into the grids, the upper roll pressing a supply down from above between the fingers 35 and the lower roll forcing another supply upward into the interstices. An excess of the paste is allowed to pass between the bite of the rolls (with the grids) and the greater part of this excess is removed by the blades 38. The removed excess passes around the peripheries of the rolls back to the receiving side of the bite. The paste remaining on the grids is now given its initial compression by the resilient blades 40 as the grids pass out from the opening 39 onto the rails 53 and 54. During the passage through the mud hopper the mud is not applied to the lugs 14a of the grids as these lugs are protected, as shown in Fig. 7, by the guard receptacle 29. We have found that the best results are secured when the lower mud roll 33 is driven at a substantially higher peripheral speed than the roll 32. This compensates for the relatively rapid delivery of the paste to the upper surfaces of the grids and gives the desired uniform supply to the bottom surface.

As the grids pass along the rails 53 and 54 their surfaces are moistened by water from the tubular members 56 and are subjected to the troweling action of the blades 57, 58 and 62. Any excess of the paste is forced out through the perforations 61 and serrations in the blades 58. Finally the grids pass between the blades 62 both of which have the smooth, straight edges adapted to impart the desired smooth finish to the solidly and uniformly filled interstices of the grids. The grids are finally collected in a suitable receptacle (not shown) at the delivery end of the rails 53 and 54.

It will now be understood that economy in the use of paste is promoted and the usual tedious cleaning of the parts, for repeated use of the machine, is for the most part obviated by our arrangement whereby an endless and continuously moving line of grids is caused to pass through the paste hopper. The space between lugs on the successive grids is not filled with the paste because the lugs are confined in the receptacle 29 at one side of the passage for the paste. Smooth, continuous advance of the grids in edge to edge contact is effected by our arrangement of means for removing grids from the bottom of the hopper and only slight variation in the power is required to separate the grids. Continuous flow of the paste to the mud rolls is insured by the blades 44 and reciprocating plate 49 operating in the throat or feed passage 34. Our adjustment of the pressure plates 40 adapts the machine to operate efficiently with grids of different thicknesses and to compensate for paste of different consistency, while giving the proper initial compression of the paste in the grids as they leave the paste hopper.

Having described our invention what we claim as new and desire to protect by Letters Patent is:

1. A pasting machine comprising, a receptacle for grids to be filled, a paste container, means forming a path for said grids from said receptacle to and through said container, feed rolls disposed on opposite sides of said path to grip the grids between them, said rolls being arranged to advance said grids in edge to edge contact one with another through said supply, means for feeding grids from said receptacle in edge to edge contact at the bite of said rolls and means associated with said feeding means for compensating for non-uniformities in the widths of the grids.

2. In a pasting machine, a receptacle for grids to be filled, a paste container, means forming a path for grids extending from said receptacle to and through said container, a feed element arranged to successively remove grids from said receptacle and to move them along said path and a friction drive for said element arranged to permit a retarding of said element upon the engagement of one grid with another.

3. In a pasting machine, a receptacle for grids to be filled, a paste container, means forming a path for grids extending from said receptacle to and through said container, a feed element arranged to successively remove grids from said receptacle and to move them along said path, means for retarding the grids in advance of said element and a friction drive for said element arranged to permit a retarding of said element upon the engagement of one grid with another in advance thereof.

4. In a pasting machine, a receptacle for grids to be filled, a paste container, means forming a path for grids extending from said receptacle to and through said container, a reciprocating feed element arranged to successively remove grids from said receptacle, a rotary feed element arranged to receive grids from said element and to move them along said path, a friction drive for said element arranged to permit a retarding of said element upon the engagement of one grid with another and means for operating said rotary feed element to advance grids at a speed slower than the speed of the reciprocating feed element.

5. In a pasting machine, a receptacle for grids to be filled, a paste container, guides for grids extending from said receptacle to said container and forming a continuous path for said grids, feed rolls having knurled peripheries disposed on opposite sides of said path to grip the grids between them, a reciprocating feed element arranged to successively remove grids from said receptacle and to advance them between the bite of said rolls and a friction drive for said reciprocating element arranged to permit a retarding of said element in its feeding stroke upon the engagement of one grid with another in the bite of said rolls.

6. In a pasting machine, the combination of means for moving grids substantially horizontally along a determined path with means for supplying paste to said grids comprising, rolls mounted respectively above and below said path to receive said grids between them, a horizontal support for the grids having fingers projecting closely adjacent to the bite of said rolls at the receiving side thereof and means for supplying the paste to the peripheries of said rolls and for allowing the passage of the paste between said fingers to the bottom of the grids.

7. In a pasting machine, the combination of a paste hopper with means for moving grids substantially horizontally through said hopper and means in said hopper for supplying paste to said grids comprising, rolls adapted to receive said grids between them, supporting fingers projecting adjacent to the bite of said rolls at the receiving side thereof and means for allowing the passage of the paste downward between said fingers into the bottom of the grids.

8. In a pasting machine, means for guiding a series of grids along a determined path, means for supplying paste to said grids during their passage along said path, rolls for applying paste to said grids revolubly mounted in said paste supply and disposed on opposite sides of said path, means forming a peripheral passage for the paste around the periphery of at least one of said rolls for conducting the paste from the delivery to the feeding side of the bite of said rolls and means for directing paste into said passage from the delivery side of the rolls.

9. In a pasting machine, means for guiding a series of grids along a determined path, a hopper arranged to supply paste to said grids during their movement along said path, rolls, for applying paste to said grids, revolubly mounted in said hopper and disposed on opposite sides of said path, means forming a passage for the paste around the periphery of at least one of said rolls for conducting the paste from the delivery to the receiving side of the bite of said rolls, means for directing paste into said passage from the delivery side of the rolls and a support for the grids adjacent to the receiving side of the bite of the rolls having openings therethrough to admit paste from said passage to the bottom of the grids.

10. In a pasting machine, means for feeding a series of grids along a determined path, a paste hopper having an opening therethrough for the grids, top and bottom paste rolls revolubly mounted in said hopper above and below said opening respectively, said rolls being arranged to allow the movement of grids between them together with an excess of paste, means forming a passage for said excess paste extending around the lower periphery of said bottom roll and arranged to deliver said paste near the bite of said rolls at the receiving side thereof and beneath the grids, and means for directing said excess paste into said passage.

11. In a pasting machine, a paste hopper having an opening therethrough for grids to be filled, means in said hopper for directing the paste into the interstices in the grids and means for restricting the outlet end of said opening comprising, thin, wide, flexible, resilient plates having flat, smooth faces extending obliquely toward each other and at acute angles to the faces of the grids in said passage to engage opposite faces of the filled grids and adjustable means for extending said plates toward the grids.

12. In a pasting machine of the class described, a paste hopper having an opening therethrough for the grids, means in said hopper for directing the paste into the interstices in the grids and means for restricting the outlet end of said opening comprising, flexible plates extending obliquely toward each other in said passage to engage opposite surfaces of the filled grids, movable keys for transmitting motion to said plates and tapered set screws for extending said keys to bend said plates toward the grids.

13. In a machine of the class described, the combination with means for filling the interstices in grids with paste, of means for moving said grids along a determined path and means for troweling the faces of said grids during their passage along said path comprising, obliquely disposed, flexible blades engaging said faces, at least one of said blades having openings therethrough to permit the escape of excess paste.

14. In a machine of the class described, the combination with means for filling the interstices in grids with paste of means for moving said grids along a determined path and means for troweling the surfaces of said grids comprising, oppositely disposed, flexible blades engaging said surfaces, at least one of said blades having a serrated edge and openings therethrough to permit the escape of excess paste.

15. A pasting machine of the class described, comprising means for filling the interstices in grids with paste, means for moving said grids along a determined path and means for compressing said paste and forming smooth outer surfaces comprising, means for moistening said surfaces and flexible blades arranged to simultaneously engage opposite faces of the grids for troweling the moistened surfaces during their movement along said path.

16. In a pasting machine, means for filling the interstices in grids with paste, means for moving said grids along a determined path and means for forming smooth surfaces on the moving grids comprising, means for moistening said surfaces, and a pair of flexible blades arranged to simultaneously engage opposite surfaces of the grids for troweling the moistened surfaces, at least one of said blades having openings therein adjacent to its working edge to allow the escape of excess paste.

17. A pasting machine having a hopper for grids comprising, a base receptacle adapted to receive a small number of grids in horizontal position, one upon another, an upper portion of the hopper having guide surfaces for downward movement of an additional supply of grids, a part of said guide surface being offset inward to retain the grids in inclined position and means for removing the grids from the bottom of said receptacle.

18. A pasting machine having a hopper for grids comprising, a base receptacle adapted to receive a predetermined small number of grids in horizontal position, one upon another, an upper portion of said hopper of narrower width adapted to retain an additional, larger supply of grids in inclined position and with the bottommost grid resting at one edge only on said grids in horizontal position and means for removing the grids from the bottom of said receptacle.

19. In a pasting machine, means for moving grids along a determined path, means for scouring the surfaces of said grids disposed in the path of said grids and means for supplying paste to the scoured surfaces of said grids.

20. In a pasting machine for battery grids, means for scouring the surfaces of grids preparatory to applying paste thereto comprising, rotary brushes having bristles engaging opposite sides of the grids, means for rotating said brushes and means for passing the grids between said brushes.

21. In a pasting machine, the combination of means for moving grids along a determined path and means for supplying paste to the grids comprising, a paste container having an opening to receive said grids, rolls mounted in said container and having, substantially cylindrical peripheries positioned in close proximity to the path of the grids through said opening, said container having a wide passage extending past the outer periphery of one of said rolls directly to the grids at the feeding side of the bite of said rolls and said rolls having fixed axes of rotation at opposite sides of said path and means for rotating said rolls to positively press paste directly into the grids from opposite sides by rolling action.

22. In a pasting machine, the combination of means for moving grids substantially horizontally along a determined path and means for supplying paste to said grids comprising, rolls having substantially cylindrical peripheries mounted above and below said path with horizontal, fixed axes to receive said grids between them, a paste container enclosing said rolls and formed to deliver paste directly into the grids and between the bite of said rolls and means for rotating said rolls, the peripheries of said rolls being continuously located in close proximity to the grids to supply paste thereto by direct rolling action in the bite of said rolls, while actuating the paste adjacent to the grids along said path with the grids.

23. A pasting machine having in combination a paste container formed with an opening therethrough for the passage of grids to be filled, a pair of rolls mounted in said container on opposite sides of said opening respectively, the peripheries of said rolls constituting guides for movement of the grids through said opening and said rolls having fixed axes of rotation at opposite sides of said opening and being arranged to press the paste directly into the grids between the bite of the rolls, means for moving the grids through said opening and means for rotating said rolls in directions such that the guide peripheries of the rolls are actuated in the direction of movement of the grids in the said opening.

24. In a pasting machine, a paste hopper having an opening therethrough for the grids to be filled, means in said hopper for directing the paste into the interstices in the grids, means for actuating the grids through said opening and means for restricting the outlet end of said opening comprising thin, wide, flexible and resilient plates having flat, smooth faces extending obliquely toward each other and at acute angles to the faces of the grids in said opening to engage opposite faces of the filled grids.

CARL G. REETZ.
GEORGE N. GOODRICH.